Patented Feb. 12, 1935

1,990,904

UNITED STATES PATENT OFFICE 1,990,904

MANUFACTURE OF CELLULOSE ETHERS

Frederick Charles Hahn, Wilmington, Del., assignor to E. I. du Pont de Nemours & Company, Wilmington, Del., a corporation of Delaware No Drawing. Application January 25, 1933, Serial No. 653,545

2 Claims. (Cl. 260—152)

This invention relates to the manufacture of aliphatic cellulose ethers, and more particularly to an improved method for producing these ethers in a purified state.

The method usually used for manufacturing ethyl cellulose, and other aliphatic cellulose ethers, consists, for example, in mixing cellulose, caustic soda, water, ethyl chloride, with or without a diluent such as benzene, in an autoclave under pressure at elevated temperature for several hours. The reaction mixture consists of a viscous solution of ethyl cellulose dissolved in the benzene, excess ethyl chloride, and ethyl alcohol and ethyl ether formed as by-products, and crystals of sodium chloride mixed with some of the excess caustic and water. The reaction mixture is steam distilled while mixing. This step removes the volatile solvents (benzene, ethyl chloride, ethyl alcohol, and ethyl ether) leaving the ethyl cellulose as a solid mixed with salt solution. As the solvents are removed the ethyl cellulose solution becomes more viscous, changes to a plastic mass, and finally to a solid. Under these conditions the ethyl cellulose tends to come down in a tough, rubber-like, dense mass which is difficult to wash free from salts. About the only way it can be purified satisfactorily is to grind the mass prior to washing. The grinding, however, is difficult and is an undesirable step.

This invention has as an object an improved method for making ethyl cellulose, and other aliphatic cellulose ethers, which yields the cellulose ether in a form in which the impurities may be readily removed.

I have discovered that in the process for manufacturing ethyl cellulose as outlined above, the disadvantages of the formation of the rubber-like mass, with consequent difficulties in purification, can be avoided by treating the reaction mixture prior to steam distillation with some water and a small amount of Turkey red oil, or similar dispersing agent, mixing thoroughly and then steam distilling as described above. Under these conditions the ethyl cellulose comes out as a finely divided, porous solid in which form it may be purified easily by washing.

The following examples are illustrative of the method for carrying out the invention:

Example I

Seven hundred grams of alkali cellulose (prepared by steeping cellulose in 50% caustic soda solution and pressing out the excess liquor) containing approximately 203 grams of cellulose, 268 grams of caustic soda, and 229 grams of water is treated with 217 grams of solid caustic soda, and shredded until the mixture is uniform. The resulting mixture, 700 grams of ethyl chloride, and 1000 grams of benzene are added to an autoclave and stirred and heated for five hours at 150° C. A solution of one gram of Turkey red oil in 500 grams of water is added to the reaction mass, either directly or after cooling, and the mixture is stirred to obtain uniform incorporation of the dispersing agent. The resulting uniform, viscous emulsion is steam distilled while mixing to remove the volatile solvents, benzene, ethyl alcohol, ethyl ether, and excess ethyl chloride. The ethyl cellulose remains as a finely divided, porous solid suspended in an aqueous solution of salt and the excess caustic soda. In this physical form it is easily purified by the usual washing treatments.

Example II

One hundred grams of cellulose, 300 grams of caustic soda, 400 grams ethyl chloride, and 500 grams toluene are mixed in an autoclave for eight hours at 140–160° C. The reaction mass, either directly or after some cooling, is mixed with five grams of sodium oleate (dissolved in a little water) until the latter is uniformly incorporated. The mixture is then steam distilled to remove the volatile solvents. The ethyl cellulose is obtained in a fine, porous form as described previously and may be readily purified by washing.

Example III

By substituting an equivalent amount of propyl bromide in place of the ethyl chloride used in Example I, propyl cellulose will be obtained in a physical form similar to that in which the ethyl cellulose was obtained.

Example IV

One hundred grams of alkali cellulose (prepared as described in Example I), 70 grams of ethyl chloride, 30 grams of methyl chloride, and 150 grams of benzene are mixed in an autoclave for two hours at 120° C. and four hours at 150° C. The reaction mass is treated with one gram of Turkey red oil as described in Example I and then steam distilled. The resulting methyl ethyl cellulose is obtained in a finely divided, porous form.

The amount of dispersing agent used may be varied. It has been found that five to ten percent, or even one percent, (based on the cellulose used) in some cases, is ample. However, larger amounts may be used.

Dispersing agents other than Turkey red oil or sodium oleate that may be satisfactorily used are those such as soaps, alkali salts of petroleum sulfonic acids and naphthenic acids, alkali salts of fatty acids containing over four carbon atoms, sodium lauryl sulfate, salts of alkyl naphthalene sulfonic acids and in general agents which are effective in alkaline solution.

The present process is not limited to ethyl cellulose but is applicable to other aliphatic cellulose ethers such as propyl cellulose and butyl cellulose, or mixed ethers such as methyl ethyl cellulose, methyl propyl cellulose, ethyl propyl cellulose, methyl butyl cellulose, ethyl glycol cellulose, vinyl cellulose, crotyl cellulose, etc., and in general to ethers in which the substituted group has up to four carbon atoms. The process is less advantageous with higher ethers such as amyl cellulose since the reaction by-products, e. g. amyl alcohol and amyl ether, are less readily removed by the steam distillation step.

It will be apparent from the foregoing that my improved method of manufacturing ethyl cellulose, and similar cellulose ethers, is economical and advantageous in practice, eliminating as it does the difficult grinding step prior to washing, and furthermore producing the product in light, porous form more readily purifiable by washing treatments.

As many apparently widely different embodiments of this invention may be made without departing from the spirit and scope thereof, it is to be understood that I do not limit myself to the specific embodiments thereof except as defined in the following claims.

I claim:

1. In the manufacture of a cellulose ether substantially free from impurities, the steps which consist in producing an ethyl ether of cellulose, adding to the reaction mixture containing the ethyl ether of cellulose a dispersing agent consisting of an aqueous solution of Turkey red oil, segregating the cellulose ether by distilling with steam while mixing to remove volatile impurities, and washing the cellulose ether.

2. In the manufacture of a cellulose ether substantially free from impurities, the steps which consist in producing an aliphatic ether of cellulose, adding to the reaction mixture containing the aliphatic ether of cellulose water and a dispersing agent of the class consisting of Turkey red oil, a soluble soap, an alkali salt of a petroleum sulfonic acid, an alkali salt of a naphthenic acid, sodium lauryl sulfate, and a salt of an alkyl naphthalene sulfonic acid, segregating the cellulose ether by distilling with steam while mixing to remove volatile impurities, and washing the cellulose ether.

FREDERICK C. HAHN.